United States Patent [19]

Legatti

[11] Patent Number: 4,598,331

[45] Date of Patent: Jul. 1, 1986

[54] GROUND FAULT CURRENT INTERRUPTER CIRCUIT WITH OPEN NEUTRAL AND GROUND LEAD PROTECTION

[75] Inventor: Raymond H. Legatti, Clearwater, Fla.

[73] Assignee: Technology Research Corporation, Clearwater, Fla.

[21] Appl. No.: 635,459

[22] Filed: Jul. 30, 1984

[51] Int. Cl.4 .............................................. H02H 3/26
[52] U.S. Cl. ......................................... 361/46; 361/45
[58] Field of Search ............................ 361/44, 45, 46; 340/650, 651

[56] References Cited

U.S. PATENT DOCUMENTS

| | | | |
|---|---|---|---|
| 3,676,737 | 7/1972 | Garzon | 361/45 |
| 4,020,394 | 4/1977 | Potash | 361/45 |
| 4,216,516 | 8/1980 | Howell | 361/45 |

Primary Examiner—G. P. Tolin
Assistant Examiner—Jeffrey A. Gaffin
Attorney, Agent, or Firm—Haight, Hofeldt, Davis & Jambor

[57] ABSTRACT

A ground fault current interrupter circuit is provided in which open neutral and open ground conditions create actuation of the interrupter circuit, as well as a ground fault. This is achieved by utilizing a supplemental secondary winding on the differential transformer of a common type of ground fault interrupter circuit. An open neutral lead or an open ground lead produces a current flow through the supplemental secondary winding that induces a trip signal in the secondary winding to initiate opening of the power line. In a second embodiment the supplemental secondary winding induces a trip signal in the transformer only for an open ground lead, while tripping for an open neutral is achieved by directly gating an SCR switch. The circuit arrangements also protect against other conditions, such as a potential in excess of a predetermined voltage between the neutral and ground leads or a reversal of the input connections.

17 Claims, 4 Drawing Figures

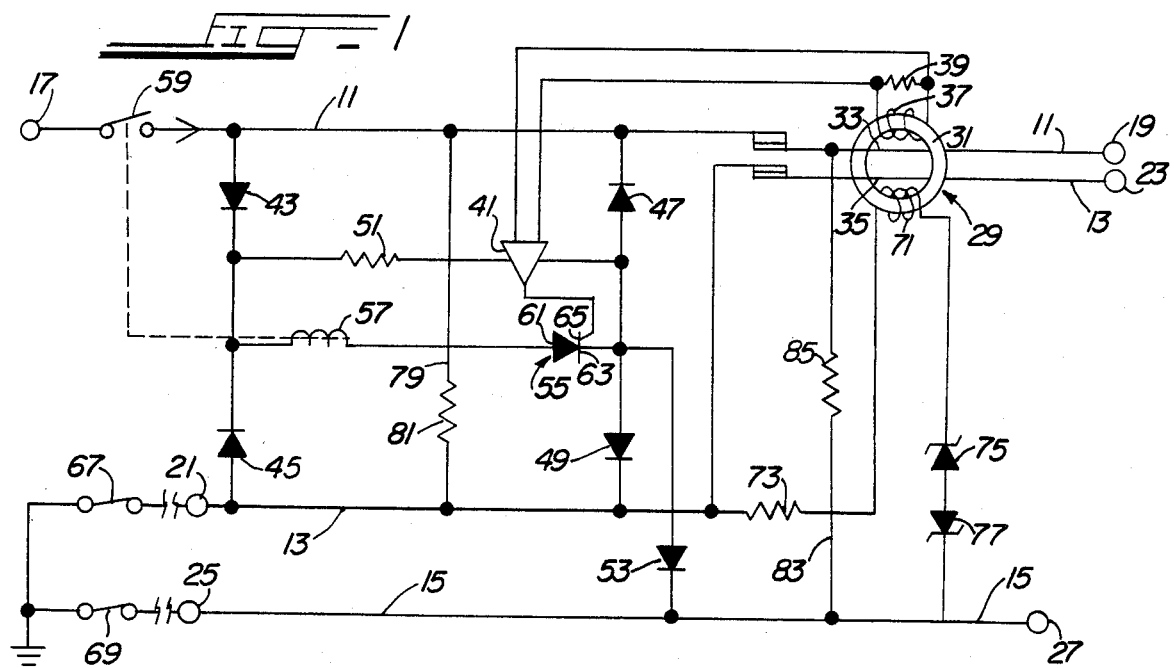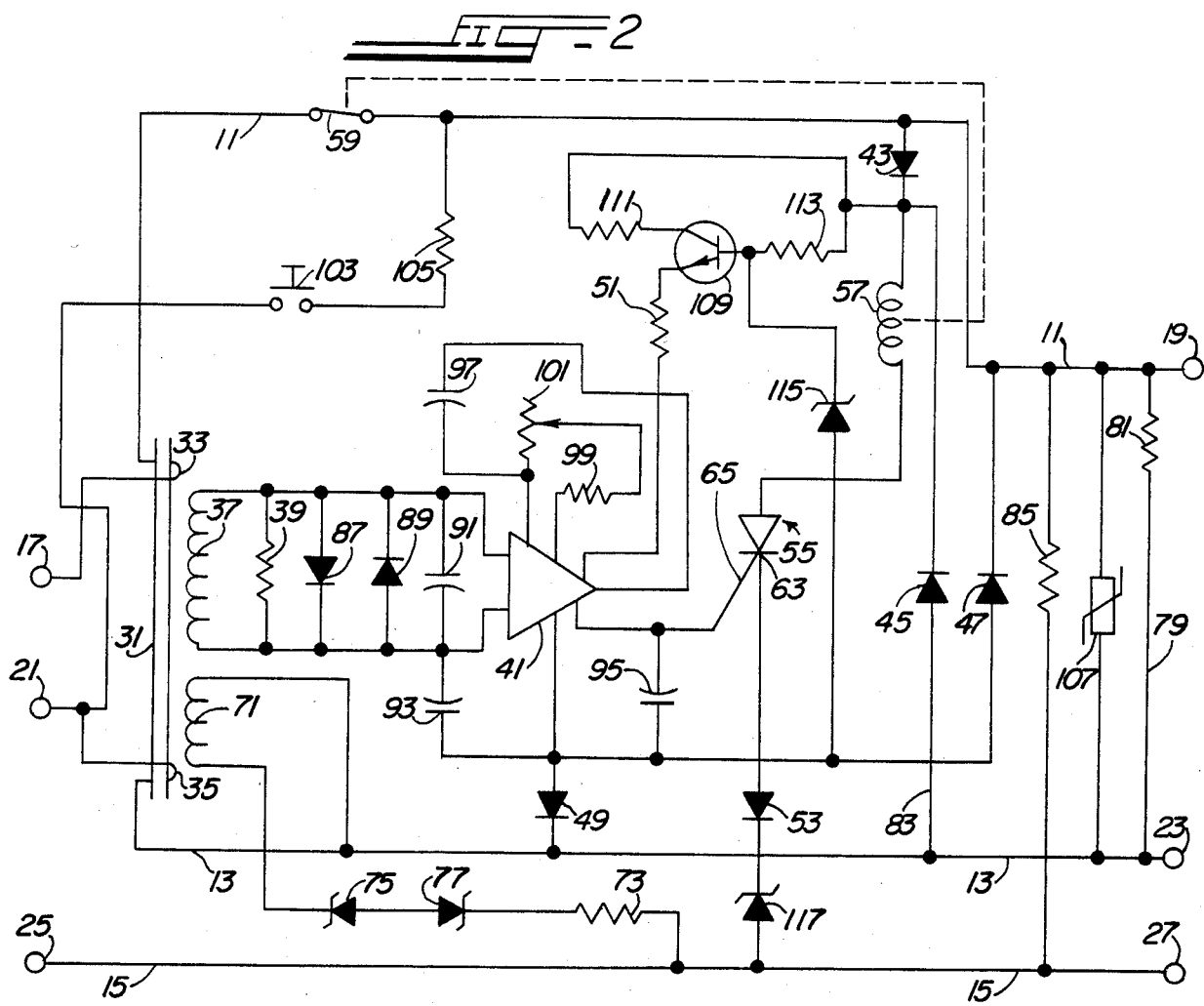

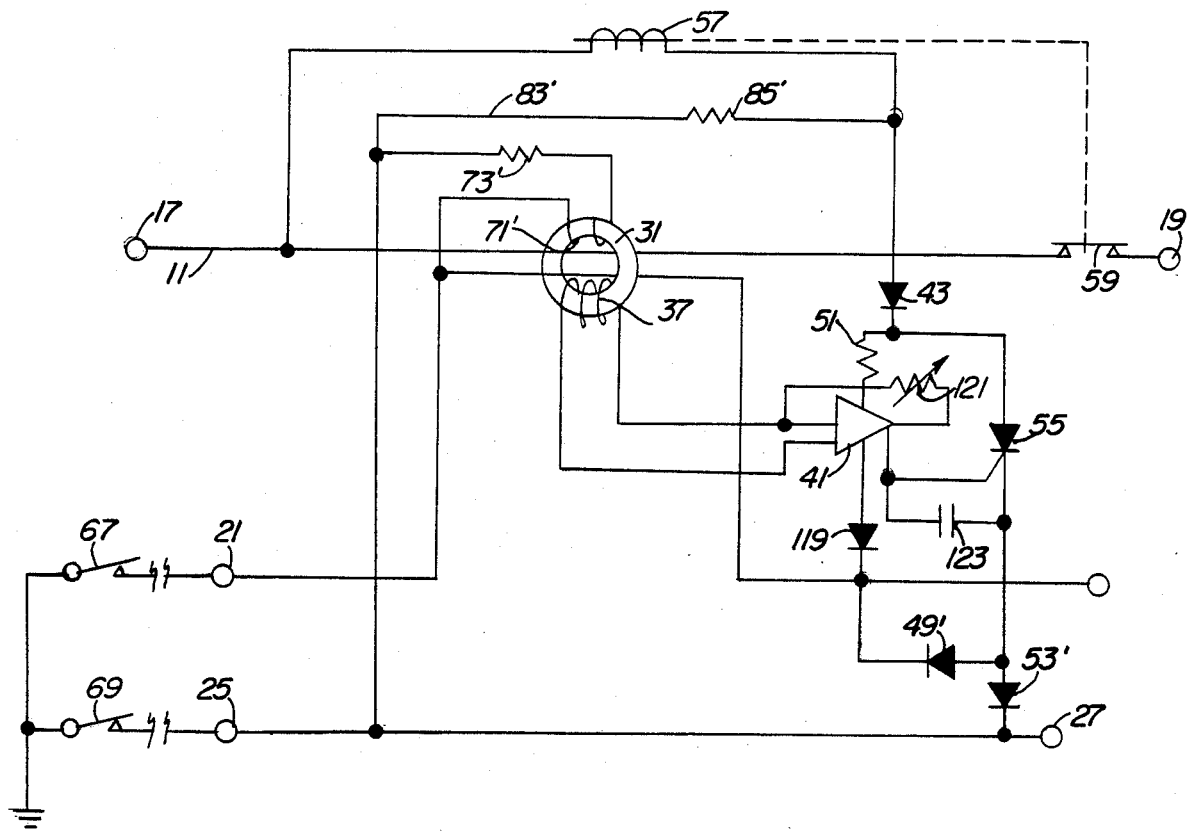
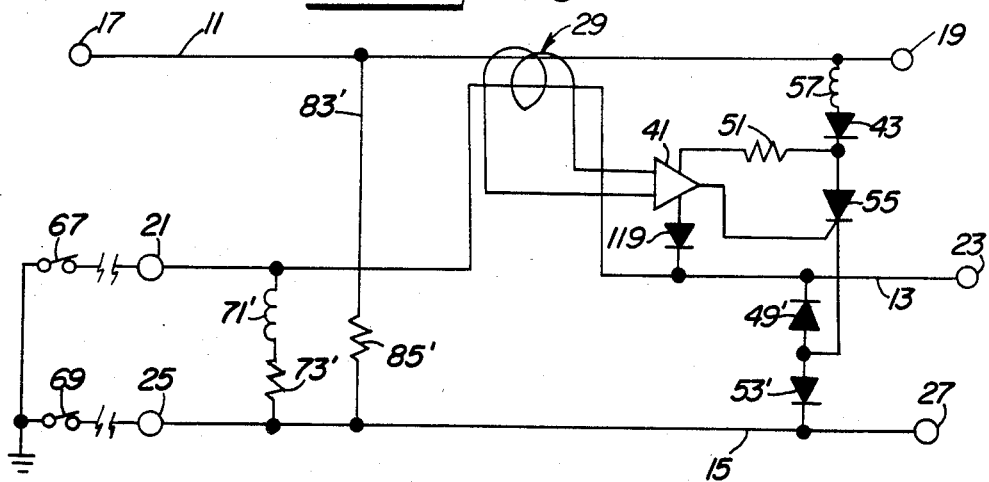

GROUND FAULT CURRENT INTERRUPTER CIRCUIT WITH OPEN NEUTRAL AND GROUND LEAD PROTECTION

BACKGROUND OF THE INVENTION

1. Field of the Invention

This invention relates generally to ground fault current interrupter circuits, and more specifically, this invention relates to a ground fault current interrupter circuit that is actuated to interrupt the power line not only by a ground fault but also by an open neutral lead or an open ground lead.

2. Description of the Prior Art

Ground fault current interrupter circuits are used to protect against an undesired grounding of a power line, such as by a person inadvertently being connected from the power line to ground at an outlet in the home. A common form of such a ground fault current interrupter circuit includes a differential amplifier with opposing primary windings, one associated with the power line and one with the neutral return. If a ground fault should occur on the load side of the interrupter circuit, the two primary windings will not cancel, with the result that a flux flow is produced in the core of the transformer. This resultant flux flow is detected by a secondary winding on the differential transformer, which then actuates a circuit opening arrangement to open the power line.

While these ground fault current interrupter circuits work quite adequately in most situations, they are energized from the power line and hence utilize the neutral lead (or in some cases the ground lead) to complete the circuit. Thus, if the neutral (or ground) lead were open between the source of energy and the interrupter circuit, it would not be possible to energize the circuit opening device of the ground fault current interrupter circuit. Therefore, in the event of a ground fault, the interrupter circuit would not open the power line and there would be a risk that someone could be exposed to electrical shock, or that equipment could be exposed to damage.

There are other types of situations in which hazards are posed that are not protected against by the standard ground fault current interrupter circuit. Thus, a voltage could develop between the neutral lead and the ground lead that, if it became large enough, could create a hazardous situation. Also, if the input connections became reversed so that the power input is connected to the neutral lead, the result could be that the ground fault current interrupter circuit is inoperative or that other risks are produced.

Accordingly, it would be desirable to have a ground fault current interrupter circuit that could be actuated in the event of a variety of conditions, such as open neutral or ground leads or a reversal of the input connections, in order to protect against any attendant harm associated with these and other conditions, as well as providing basic protection from ground faults.

SUMMARY OF THE INVENTION

The present invention provides an arrangement in which the ground fault current interrupter circuit will be energized to open the power line in the event that either the neutral or ground lead is open, a potential in excess of a predetermined voltage exists between the neutral and ground leads, or there is a reversal of the input connections to the interrupter circuit. These important additional benefits are achieved by supplementing the standard ground fault current interrupter circuit with relatively few additional components, which minimizes the additional complexity and cost of the circuitry.

To achieve these results, a supplemental secondary winding is located on the differential transformer. This supplemental secondary winding is provided with a number of turns, such that when the current in the supplemental secondary winding exceeds a predetermined magnitude, the secondary winding will produce a trip signal to energize the circuit opening device. The supplemental secondary winding is connected between the neutral and ground leads. A supplemental resistance is connected in series with the supplemental secondary winding to aid in establishing a predetermined voltage which the potential between the neutral and ground leads must exceed before a current of the predetermined magnitude will flow in the supplemental secondary winding. In addition, the supplemental resistance serves to limit excess current flow through the supplemental secondary winding, and hence assists in protecting that winding from damage. Also, in one of the preferred embodiments, a pair of back-to-back Zener diodes are connected in series with the supplemental secondary winding and the supplemental resistance to preclude current flow through the supplemental secondary winding, unless the potential between the neutral and ground leads exceeds an accurately fixed predetermined voltage.

A power connection is made from the power line (frequently referred to as just the "line", with the actual conducter referred to as a "line lead") to the ground lead. A power limiting resistance is located in the power connection. Thus, in the event that the ground lead is open between the source of electrical energy and the interrupter circuit, the supplemental secondary winding will have a current flow produced therein from the line to the ground lead and through the supplemental secondary winding to neutral. This results in the circuit opening device being energized and the power line being opened.

In one preferred embodiment, a second power connection is made from the power line to the neutral lead through a second power limiting resistance. With this addition, if the neutral lead is open between the source and the interrupter circuit, a current flow path is produced from the line lead to the neutral lead and through the supplemental secondary winding to ground. Again, this will cause the circuit opening device to be actuated.

A common form of the circuit opening device is a solenoid actuated switch in the power line, with the solenoid being connected in series with a silicon controlled rectifier. One end of this series circuit is connected to the line lead, while the other end must be connected to a return, either the neutral lead or the ground lead. Since energization must be able to occur in the event of the neutral lead or the ground lead being open, it is necessary to provide some arrangement for directing the current flow through the silicon controlled rectifier (SCR) to the lead that is not open. This is achieved by a pair of back-to-back diodes connected between the neutral lead and the ground lead, with the cathode of the SCR being connected to the mid-point of the back-to-back diodes.

In a second embodiment of the present invention, actuation of the circuit opening device in response to an open neutral does not depend upon the current flow through the supplemental secondary winding, but upon the voltage drop across that winding and the supplemental resistance. Thus, the negative side of the power supply for an amplifier that conveys the secondary winding output to the gate of the SCR is connected to the neutral line. In the event of an open neutral, any current flow will have to pass through the supplemental secondary winding to the ground lead. This will cause the potential on the neutral to rise with respect to ground, thus triggering the SCR through the amplifier.

With the circuitry described, the ground fault current interrupter circuit will be energized in the presence of either an open neutral or an open ground lead, as well as a ground fault on the load side of the interrupter circuit. In addition, a potential between neutral and ground in excess of a predetermined voltage will also result in actuation of the interrupter circuit to open the power line, as will an erroneous reversal of the input connections to the interrupter circuit.

These and other objects, advantages and features of this invention will hereinafter appear, and for purpose of illustration, but not of limitation, exemplary embodiments of the subject invention are shown in the appended drawing.

BRIEF DESCRIPTION OF THE DRAWING

FIG. 1 is a simplified schematic circuit diagram of a preferred embodiment of the present invention.

FIG. 2 is a more complete schematic circuit diagram of the preferred embodiment of FIG. 1.

FIG. 3 is a simplified schematic circuit diagram of a second embodiment of the present invention.

FIG. 4 is a more complete schematic circuit diagram of the embodiment of FIG. 3.

DETAILED DESCRIPTION OF THE PREFERRED EMBODIMENT

FIG. 1 illustrates a simplified circuit diagram of the ground fault current interrupter circuit of the present invention. In this diagram, power from a source of electrical energy is conveyed to a load through a line lead 11. Return of the power is through a neutral lead 13, while a ground lead 15 provides a path to earth ground.

Connection of the power line 11 to the energy source (not shown) is made through the terminal 17, while the load connection of line lead 11 is made through terminal 19. Similarly, a source connection for neutral lead 13 is provided by terminal 21, with the load connection of neutral lead 13 being made at terminal 23. A terminal 25 provides a connection to the earth ground at the source for ground lead 15 of the interrupter circuit. To provide for a load connection to the ground lead 15, a terminal 27 is located on the load side of the interrupter circuit.

The interrupter circuit is provided with a differential transformer 29, which has a core 31. Portion 33 of line lead 11 and portion 35 of neutral lead 13 provide single turn opposed primary windings for the differential transformer 29. Under normal operating conditions, the current in line 11 and the current in neutral lead 13 will be the same, so that the magnetic flux generated by the primaries 33 and 35 will cancel. However, if a ground fault were to occur on the load side of the interrupter circuit, the current in neutral lead 13 would be less than the current in line 11. In that case, the magnetic fluxes induced by primary windings 33 and 35 would not cancel, so that a resultant flux flow would occur.

A secondary winding 37 on core 31 has a current induced in it by this magnetic flux flow. The induced current is translated into a voltage across a burden resister 39. This voltage is applied to the input of an amplifier 41.

Diodes 43, 45, 47 and 49 form a full-wave rectifying bridge. A power supply limiting resister 51 provides a power input path to the amplifier 41 from one terminal of the bridge. The other side of the power supply for amplifier 41 is connected to neutral lead 13 through diode 49 and to ground lead 15 through a diode 53. The diodes 49 and 53 are thus connected in a back-to-back configuration.

A circuit opening arrangement is provided by a silicon controlled rectifier (SCR) 55 and a solenoid 57, connected in series from the line lead 11 to the mid-point of the back-to-back diodes 49 and 53. Solenoid 57 controls a switch in line lead 11 and, usually, a corresponding switch in neutral lead 13. The anode of SCR 55 is connected to solenoid 57, while the cathode 63 of SCR 55 is connected to the mid-point of the back-to-back diodes 49 and 53. Gate 65 of SCR 55 is connected to the output of amplifier 41.

When a trip signal is produced by the secondary winding 37, SCR 55 is gated into a conductive state so that current flows through solenoid 57 and opens the normally closed switch 59. Although not shown, a similar normally closed switch in the neutral line would usually be opened also.

Potential open line conditions between the source and the interrupter circuit are schematically illustrated by switches 67 and 69. The connection of the ground lead to earth ground, as well as the connection of the neutral lead to earth ground at the source, is also schematically illustrated.

In order to protect against an opening of the neutral lead, such as at 67, or of the ground lead, such as at 69, a supplemental secondary winding 71 is located on core 31 of the differential transformer 29. Supplemental secondary winding 71 is designed with a number of turns such that when a current in excess of a predetermined magnitude flows through winding 71 a flux will be produced in core 31 to induce a current in secondary winding 37. This in turn produces a trip signal across resistor 39, in order to gate SCR 55 into a conducting state. In other words, a current in excess of the predetermined magnitude through winding 71 will cause line lead 11 to be opened.

Winding 71 is connected between neutral lead 13 and ground lead 15 in series with a resistor 73. Resistor 73, which has been termed a supplemental resistor to indicate its association with the supplemental secondary winding 71, aids in establishing the magnitude of the voltage between neutral lead 13 and ground lead 15 that will cause a current having the predetermined magnitude flow through the supplemental secondary winding 71. A pair of back-to-back Zener diodes 75 and 77 establish with precision the magnitude of the voltage between neutral lead 13 and ground lead 15 that must be exceeded to produce current flow through the supplemental secondary winding 71. It may be noted that resistor 73 will also serve a protective function in limiting the current flow through winding 71 in the presence of large voltages between the neutral lead 13 and ground lead 15.

A conductor 79 provides a power connection from line lead 11 to neutral lead 13. A resistance 81 (termed a power resistance to identify its relation to the power connection), serves to limit current flow from the line to neutral. A similar power connection 83 is made from line lead 11 to ground lead 15 through a limiting power resistance 85.

When the neutral lead 13 and the ground lead 15 are properly connected (i.e., the schematic switches 67 and 69 are closed), the supplemental secondary winding 71 is shorted out of the circuit and no appreciable current flows therein. On the other hand, if the neutral line were to be open (represented by an opening of schematic switch 67), the supplemental secondary winding 71 circuit provides the only current path for current in conductor 79. Thus, the supplemental secondary winding 71 would have a current flow produced therein that would generate a trip signal to initiate opening of line switch 59. Similarly, if the ground lead 15 were open (i.e., represented by opening of the schematic switch 69), current through the conductor 83 would pass to neutral lead 13 through the supplemental secondary winding 71 to produce a trip signal that would initiate opening of line switch 59. Therefore, protection against an open neutral lead or an open ground lead is provided.

As a matter of fact, the circuit also provides protection against any instance in which the potential between the neutral lead and the ground lead exceeds a predetermined voltage (i.e., that voltage which produces a current flow through winding 71 in excess of the predetermined magnitude). It follows that if the line and neutral input connections were reversed, the line voltage appearing on the neutral lead 13 would produce a current flow to ground through the supplemental secondary winding 71 that would actuate the interrupter circuit. As a consequence, the circuit provides protection for additional circumstances other than just an open neutral or an open ground lead.

A more detailed diagram of the FIG. 1 circuit is illustrated in FIG. 2. This is basically the same circuit with additional components to provide gain adjustment, noise rejection and transient rejection.

Thus, it may be seen that the trip signal generated across resistor 39 and applied to the input of the amplifier 41 is provided with over-voltage protection diodes 87 and 89, as well as a noise suppressor capacitor 91. Amplifier 41 is a custom integrated circuit operational amplifier with a Zener regulator. Additional noise suppressor capacitors 93, 95 and 97 are provided for the amplifier 41. A fixed resistor 99 and a variable resistor 101 provide a feed-back loop for the operational amplifier 41.

Constant current power for amplifier 41 is provided by an emitter follower circuit including a transistor 109, resistors 111 and 113, and a Zener diode 115. This circuit prevents undue power dissipation as the input voltage varies over a relatively wide range.

A normally open test switch 103 is connected in series with a limiting resistor 105 between the line lead 11 and the neutral lead 13. Additional over-voltage protection for the circuit is provided by a metal oxide varistor 107 connected between line lead 11 and neutral lead 13. Another Zener diode 117 has been added in series with the diode 53 between the cathode of SCR 55 and ground lead 15 to prevent current flow to ground in the absence of an established voltage between the cathode and ground.

Another embodiment of the invention is illustrated in a simplified form in FIG. 3. The basic components of the common ground fault current interrupter circuit are illustrated by the same numerals as in FIGS. 1 and 2, while the components of the new circuit that are similar are indicated by primed numerals. Thus, it may be seen that the only new element is the diode 119 between amplifier 41 and the neutral lead 13.

In the case of an open ground lead, this circuit works in the same fashion as described in connection with the circuit of FIGS. 1 and 2. However, in the case of an open neutral lead, a supplemental secondary winding 71' and the supplemental resistor 73' will produce a voltage difference between the neutral lead 13 and the ground lead 15. As the neutral lead 13 is the negative of the power supply for amplifier 41 through diode 119, a rise in potential on lead 13 will produce a trip signal to trigger SCR 55.

A slightly more detailed version of the embodiment of FIG. 3 is illustrated in FIG. 4. Apart from the somewhat more detailed showing of the basic features, it may be noted that a gain control resistor 121, corresponding to resistor 101 in FIG. 2, is shown. This gain control resistor adjusts the level of trip for the circuit opening by solenoid 57. Also, a noise suppressor capacitor 123, corresponding to capacitor 95 in FIG. 2, is depicted.

It should be understood that various modifications, changes and variations may be made in the arrangement, operation and details of construction of the elements disclosed herein without departing from the spirit and scope of this invention.

I claim:

1. A ground fault current interrupter circuit for use in a system having line, neutral and ground leads extending from a source of energy to a load comprising:
    a differential transformer having a pair of opposed primary windings and a secondary winding;
    circuit opening means responsive to a trip signal generated in said secondary winding when a ground fault occurs to open the line lead;
    actuating means responsive to an open neutral lead or an open ground lead between the source and the ground fault current interrupter circuit to cause energization of said circuit opening means to open the line lead; and
    directing means to complete an energizing circuit for said circuit opening means to whichever of the neutral or ground leads is not open, without providing a current path between the neutral and ground leads.

2. A ground fault current interrupter circuit as claimed in claim 1 wherein said actuating means comprises a supplemental secondary winding on said differential transformer, current flow in excess of a predetermined magnitude in said supplemental secondary winding producing a trip signal in said secondary winding.

3. A ground fault current interrupter circuit as claimed in claim 2 wherein said supplemental secondary winding is connected from the neutral lead to the ground lead and further comprising a supplemental resistance connected in series with said supplemental secondary winding to limit the magnitude of current flow therethrough.

4. A ground fault current interrupter circuit as claimed in claim 3 and further comprising a pair of back-to-back Zener diodes connected in series with said supplemental secondary winding to establish a predetermined voltage that must be exceeded before current will flow in said supplemental secondary winding.

5. A ground fault current interrupter circuit as claimed in claim 3 and further comprising:

a power connection from the line lead to the ground lead to provide a source of power for said supplemental secondary winding when the ground lead is open; and a power resistance to limit the magnitude of current flow through said power connection.

6. A ground fault current interrupter circuit as claimed in claim 5 and further comprising:

a second power connection from the line lead to the neutral lead to provide a source of power for said supplemental secondary winding when the neutral lead is open; and a second power resistance to limit the magnitude of current flow through said second power connection.

7. A ground fault current interrupter circuit as claimed in claim 5 wherein said circuit opening means comprises:

a solenoid to actuate a switch in the line lead; and a silicon controlled rectifier connected in series with said solenoid between the line lead and said directing means, an open neutral lead creating a trip signal on the gate of said silicon controlled rectifier as a result of a voltage drop developed across said supplemental secondary winding and said supplemental resistance.

8. A ground fault current interrupter circuit as claimed in claim 1 wherein said directing means comprises back-to-back diodes connected between the neutral lead and the ground lead, said circuit opening means being connected between said back-to-back diodes.

9. A ground fault current interrupter circuit, for use with a system having line, neutral and ground leads, comprising:

a differential transformer having a pair of opposed primary windings and a secondary winding;

circuit opening means responsive to a trip signal generated in said secondary winding when a ground fault occurs to open the line and neutral leads;

a supplemental secondary winding on said differential transformer; and control means to permit current flow in excess of a predetermined magnitude through said supplemental secondary winding only when conditions exist that create a potential between the neutral lead and the ground lead in excess of a predetermined voltage, current flow in excess of the predetermined magnitude through said supplemental secondary winding generating a trip signal in said secondary winding to actuate said circuit opening means.

10. A ground fault interrupter circuit as claimed in claim 9 wherein said supplemental secondary winding is connected between the neutral lead and the ground lead; and said control means comprises a supplemental resistance connected in series with said supplemental secondary winding between the neutral and ground leads to limit the magnitude of current flow through said supplemental secondary winding so that the current exceeds said predetermined magnitude only when the potential between the ground lead and the neutral lead exceeds a predetermined voltage.

11. A ground fault interrupter circuit as claimed in claim 10 wherein said control means further comprises:

a first power connection from the line lead to the ground lead to provide a source of power for said supplemental secondary winding when the ground lead is open between the source and the ground fault current interrupter circuit;

a first power resistance to limit the current flow through said first power connection;

a second power connection from the line lead to the neutral lead to provide a source of power for said supplemental secondary winding when the neutral lead is open between the source and the ground fault current interrupter circuit; and a second power resistance to limit the current flow through said second power connection.

12. A ground fault current interrupter circuit as claimed in claim 9 and further comprising directing means to complete an energizing circuit for said circuit opening means to whichever of the neutral or ground leads provides an unbroken path to earth ground at the source.

13. A ground fault current interrupter circuit as claimed in claim 12 wherein:

said directing means comprises a pair of back-to-back diodes connected between the neutral lead and the ground lead; and said circuit opening means comprises a solenoid in series with a silicon controlled rectifier, said solenoid being connected to the line lead and adapted to actuate a switch in the line lead, the cathode of said silicon controlled rectifier being connected between said back-to-back diodes, and the gate of said silicon controlled rectifier being connected to an amplifier for the output of said secondary winding, the amplifier power circuit being connected between the line lead and the neutral lead.

14. A ground fault current interrupter circuit for use in a system having line, neutral and ground leads extending from a source of energy to a load comprising:

a differential transformer having a pair of opposed primary windings and a secondary winding;

circuit opening means responsive to a trip signal generated in said secondary winding when a ground fault occurs to open the line and neutral leads;

a supplemental secondary winding located on said differential transformer and connected between the neutral and ground leads, said supplemental secondary winding designed to generate a trip signal in said secondary winding when a current in excess of a predetermined magnitude flows through said supplemental secondary winding;

supplemental impedance means connected in series with said supplemental secondary winding between the neutral and ground leads, said supplemental impedance means precluding a flow of current in excess of said predetermined magnitude through said supplemental secondary winding unless a potential in excess of a predetermined voltage is produced between said neutral lead and said ground lead; and power means to create a potential between the ground and neutral leads in excess of said predetermined voltage when the ground lead is open between the source and the ground fault current interrupter circuit.

15. A ground fault current interrupter circuit as claimed in claim 14 wherein said power means also creates a potential between the neutral and ground leads in excess of said predetermined voltage when the neutral lead is open between the source and the ground fault circuit interrupter circuit.

16. A ground fault interrupter circuit as claimed in claim 15 wherein said power means comprises:
- a first power connection from the line lead to the ground lead to provide a source of power for said supplemental secondary winding when the ground lead is open between the source and the ground fault current interrupter circuit;
- a first power resistance to limit the current flow through said first power connection;
- a second power connection from the line lead to the neutral lead to provide a source of power for said supplemental secondary winding when the neutral lead is open between the source and the ground fault current interrupter circuit; and
- a second power resistance to limit the current flow through said second power connection.

17. A ground fault current interrupter circuit as claimed in claim 14 and further comprising a pair of back-to-back diodes connected between the neutral lead and the ground lead, said circuit opening means comprising a solenoid in series with a silicon controlled rectifier, said solenoid being connected to the line lead and adapted to actuate a switch in the line lead, the cathode of said silicon controlled rectifier being connected between said back-to-back diodes, and the gate of said silicon controlled rectifier being connected to an amplifier for the output of said secondary winding, the amplifier power circuit being connected between the line lead and the neutral lead.

* * * * *

UNITED STATES PATENT AND TRADEMARK OFFICE
CERTIFICATE OF CORRECTION

PATENT NO. : 4,598,331
DATED : July 1, 1986
INVENTOR(S) : Raymond H. Legatti

It is certified that error appears in the above—identified patent and that said Letters Patent is hereby corrected as shown below:

In FIG. 2, show an electrical connection at the point where the vertical line, which joins cathode 63 of SCR 55 to diode 53, crosses the horizontal line which joins Zener diode 115 to capacitor 95:

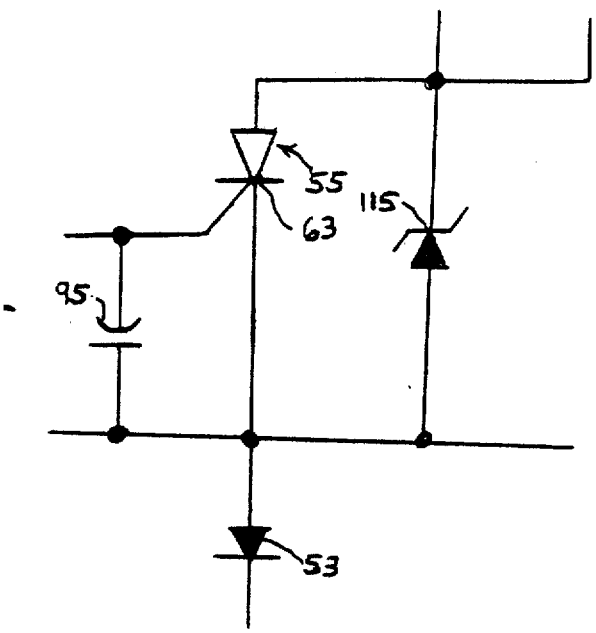

Signed and Sealed this

Twenty-eighth Day of February, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,598,331
DATED : July 1, 1986
INVENTOR(S) : Raymond H. Legatti

It is certified that error appears in the above-identified patent and that said Letters Patent is hereby corrected as shown below:

In FIG. 2, show an electrical connection at the point where the vertical line, which joins cathode 63 of SCR 55 to diode 53, crosses the horizontal line which joins Zener diode 115 to capacitor 95:

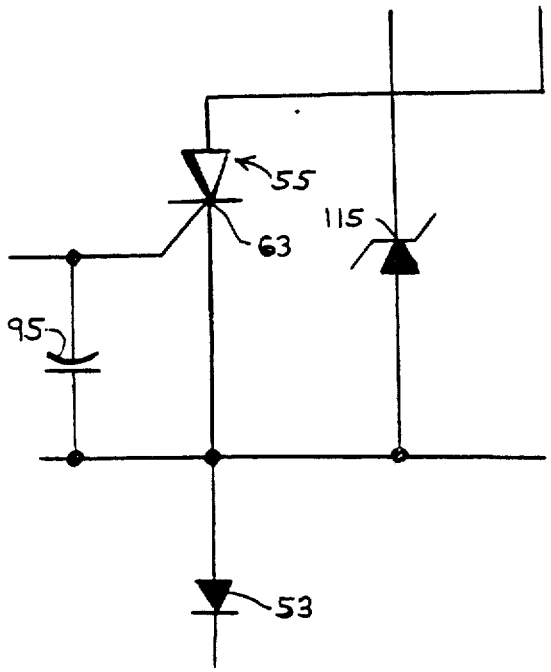

This certificate supersedes Certificate of Correction issued February 28, 1989.

Signed and Sealed this

Fifteenth Day of August, 1989

Attest:

DONALD J. QUIGG

Attesting Officer

Commissioner of Patents and Trademarks